Figure 4:
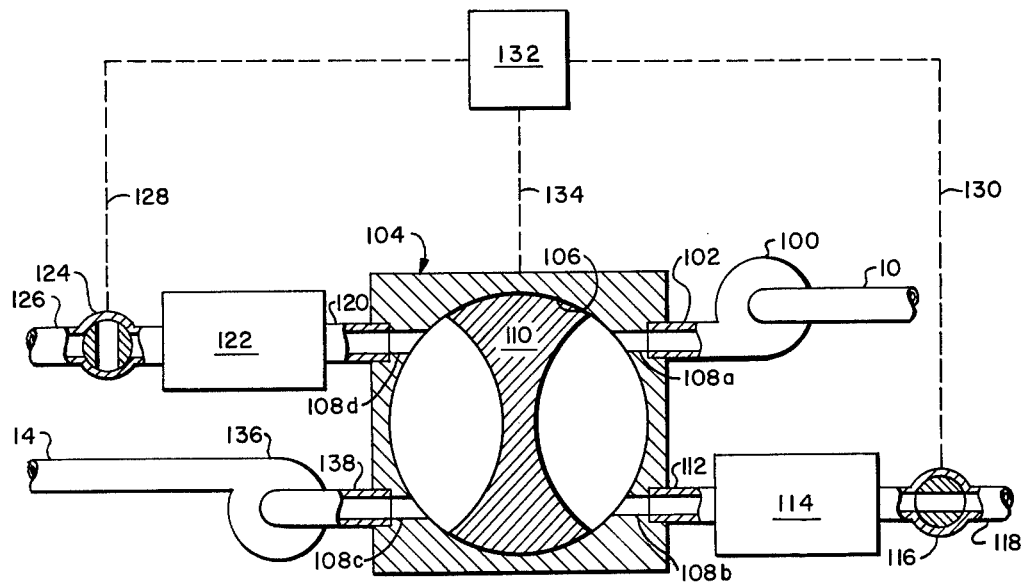

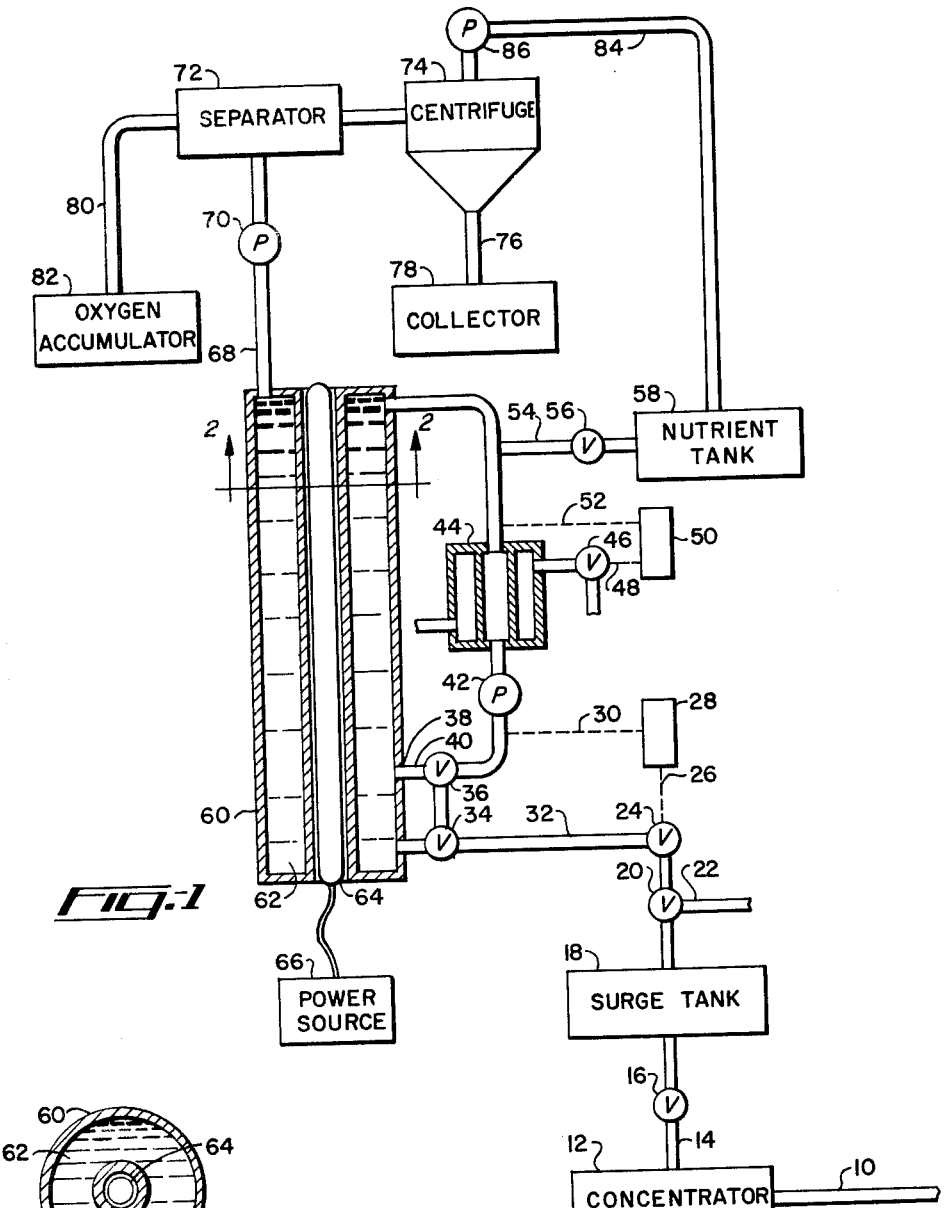

Dec. 21, 1965 R. W. TEW ETAL 3,224,143
APPARATUS AND METHOD FOR GROWING ALGAE TO RECOVER OXYGEN
Filed April 17, 1962 2 Sheets-Sheet 2

INVENTOR.
ROBERT P. GECKLER
JAMES O. SANE
RICHARD W. TEW
BY

*ATTORNEY*

United States Patent Office 3,224,143
Patented Dec. 21, 1965

3,224,143
APPARATUS AND METHOD FOR GROWING ALGAE TO RECOVER OXYGEN
Richard W. Tew, Azusa, James O. Sane, Covina, and Robert P. Geckler, Glendora, Calif., assignors to Aerojet-General Corporation, Azusa, Calif., a corporation of Ohio
Filed Apr. 17, 1962, Ser. No. 188,099
14 Claims. (Cl. 47—1.4)

This invention relates to the conversion of carbon dioxide to oxygen. More specifically this invention relates to the conversion of pure or highly concentrated carbon dioxide and water to oxygen and algae cells.

One of the problems involved in manned space flights of long duration is the maintenance in the space vehicle of an atmosphere which will sustain human life. To achieve this end it is necessary that some way be devised to replace or reclaim the oxygen in the atmosphere of the space vehicle as it is used up, while at the same time, removing the carbon dioxide as it is produced by the astronaut in the process of metabolism.

One way of maintaining an atmosphere which will support human life is to carry in the space vehicle a supply of liquefied oxygen. By this method the supply of oxygen can be utilized as needed in order to maintain an adequate amount of oxygen in the vehicle. A concomitant requirement of such a method is that excessive carbon dioxide accumulation be prevented, such as by passing the stale air through a calcium hydroxide solution.

While the foregoing method has some degree of feasibility on space flights of relatively short duration, it is virtually impossible because of weight and size considerations to employ this technique on long space flights of many months or even years duration. Therefore, extensive interplanetary travel by man requires that the need for carrying a supply of oxygen be eliminated.

This invention makes it possible to maintain a suitable atmosphere in a closed space vehicle over long periods of time without the need for addition of any new oxygen. This invention solves the above outlined problem by the use of a maximally efficient photosynthetic gas exchanger using algae.

It has been known to convert carbon dioxide to oxygen by the use of algae. However, as shown by Nielsen, E. S., Physiol. Plantarum 8, 317–335 (1955), prior attempts to convert gases containing high concentrations of carbon dioxide to oxygen have been unsuccessful. Heretofore, photosynthetic gas exchanges could handle only gas streams containing small amounts, i.e., on the order of .5% up to 10% by volume of carbon dioxide. This operating limitation resulted in the need for very large converters, since the use of such dilute streams necessitated that the total gas throughput be very great. Large algae converters capable of handling great volumes of gas are not suitable in space vehicles where space and weight conservation are critical.

It has now been found that gas feed streams containing a high proportion, i.e., from about 70% to 100% by volume, of carbon dioxide can be converted almost completely to oxygen by the use of algae. Since our invention permits of the handling of concentrated carbon dioxide, the size and weight of the algae converter can be reduced to such an extent that it is ideally suited for use in space vehicles.

It is an object of this invention to provide an apparatus and method suitable for use in space vehicles which will continuously replenish the supply of respiratory oxygen. Another object of the present invention is to eliminate the need for carrying large supplies of oxygen in space vehicles. Still another object of this invention is to continuously convert concentrated carbon dioxide to oxygen by a process employing algae. These and other objects of the invention will appear from the description which follows, together with the accompanying drawings.

This invention involves a continuous culture system in which constant algae growth rates and concentrations are equal to constant gas addition rates and composition. In accordance with this invention, concentrated carbon dioxide is converted to oxygen and algae by a continuous process wherein the gas stream containing a high concentration of carbon dioxide is contacted countercurrently, in the presence of light, with a nutrient-containing aqueous stream of algae. The composition of the aqueous stream containing algae is kept more or less constant by continuous dilution with water containing nutrient, and removal of algae. It is essential that the carbon dioxide addition rate be approximately equivalent to the rate of carbon dioxide uptake by the algae. Not only should the carbon dioxide addition rate be in proportion to the growth rate of the algae, but also the pH of the algae stream should be maintained within the range conducive to maximal algae growth rates. This pH range is from about 4 to 9.5, and more preferably from 5 to about 7.

More specifically, the process of this invention involves the continuous conversion of a gas feed stream containing a relatively high proportion of carbon dioxide to a gas product stream containing a relatively high proportion of oxygen. This process is practiced by establishing an algae zone containing an aqueous medium comprising algae and a nutrient, maintaining the pH of said aqueous medium within said algae zone within a range of about 4 to about 9.5, continuously diluting said aqueous medium with an aqueous solution of said nutrient, continuously supplying said algae zone with visible light, continuously passing a gas feed stream containing a relatively high proportion of carbon dioxide into and through said algae zone in finely dispersed form, continuously removing excess liquid medium and product gas stream containing a relatively high proportion of oxygen from said algae zone, and recovering said product gas stream containing a relatively high proportion of oxygen.

Figure 5:
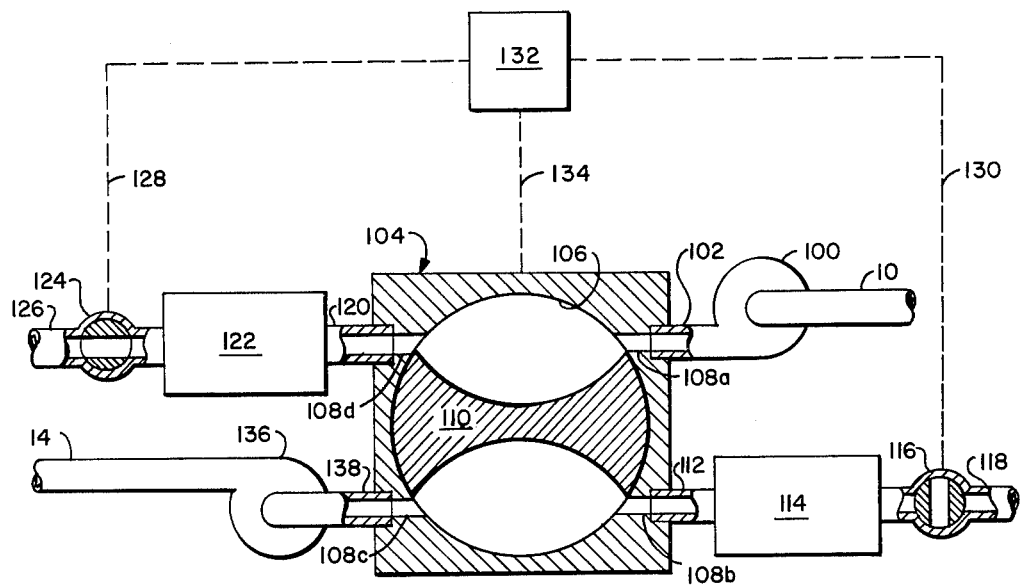

Referring to the drawing, FIGURE 1 is a side view, partly in section, of apparatus which can be used in carrying out our invention. FIGURE 2 is a cross-sectional view of the algae zone of FIGURE 1. FIGURE 3 is a cross-sectional view of still another embodiment of the algae zone. FIGURE 4 is a detailed drawing of the carbon dioxide concentrator of FIGURE 1 in one phase of its operation. FIGURE 5 shows the carbon dioxide concentrator in its other phase of operation.

FIGURE 1 illustrates one type of apparatus which we have found to be suitable in the practice of our invention. The apparatus comprises an algae column 60, which is normally made of a transparent material such as glass. However, in the event the light source is inside the algae zone, the exterior of the zone may be covered with a reflective material such as aluminum foil in order to assure the most effective utilization of the light energy. Through line 32, carbon dioxide is introduced into the lower end of the algae zone. The end of line 32 may be fitted with a sparger, which aids in dispersing the carbon dioxide as it is introduced into the algae zone. In lieu of the sparger, the gas inlet may be fitted with a fritted disc which also serves to disperse the carbon dioxide. Line 32 connects through a valve 24 to a carbon dioxide concentrator 12. This valve serves to control the rate of carbon dioxide addition. The carbon dioxide concentrator, which is described in greater detail in FIGURES 4 and 5, serves to raise the carbon dioxide content of the gas stream entering the algae zone to a suitable level.

The stale air, containing on the order of 0.1% to 0.3% carbon dioxide, is drawn through line 10 into the concentrator 12 where the carbon dioxide is concentrated so that the effluent leaving the concentrator through line 14 is between about 70% and 100% carbon dioxide. The concentrated carbon dioxide then passes through check valve 16 into surge tank 18. The surge tank serves to retain carbon dioxide temporarily in the event that the carbon dioxide is being concentrated at a rate faster than it is being admitted to the algae zone by valve 24. Check valve 16 maintains unidirectional flow in line 14 and prevents any back-pressure produced by accumulated carbon dioxide in the surge tank from being forced back into the concentrator 12. If it is desired to dilute the carbon dioxide before introduction into the algae zone, dilution may be obtained by admitting air through line 22 and mixing valve 20.

The lower end of the algae zone is connected through line 40 to the upper end of the algae zone. In this line is a recirculating pump 42 which serves to withdraw the aqueous medium containing algae and some entrained gas from the bottom of the algae zone and pump it through heat exchanger 44 to the top of the algae zone where it is again introduced into the zone. The passage of the algae medium through the pump effects agitation of the liquid. Recirculation of the algae medium to produce a countercurrent flow between the gas and the liquid in the algae zone brings about functional separation of the gas stream from heat exchange and uniformity of the irradiance reaching each algae cell. The heat exchanger 44 is employed so as to maintain the temperature in the algae zone within limits favorable to optimum conversion of carbon dioxide to oxygen.

If desired, the carbon dioxide need not be introduced through line 32. Rather, valve 34 may be closed and valve 36 opened so that the concentrated carbon dioxide can be introduced into the recirculating line 40 near to the point 38 where it joins the algae zone. In such case, the end of line 40 should also be fitted with a sparger or other gas dispersing device. It has been found that the introduction of the carbon dioxide into the recirculating line increases the amount of entrained gas passing with the liquid through the recirculating pump. In such manner, part of the carbon dioxide introduced passes up the algae zone countercurrently, the carbon dioxide being converted to oxygen as it passes through the downwardly flowing liquid.

The rest of the carbon dioxide is passed through the pump, where the gas is even more finely dispersed, and re-enters the algae zone at the top. Since the gas in the re-entering liquid is very finely divided, it tends to be carried downward in the algae zone by the force of the liquid flow. As it proceeds downward, the carbon dioxide is gradually converted to oxygen. The oxygen, being a lighter gas, tends then to rise in the algae zone. The result is that the oxygen is countercurrently stripped from the flowing liquid.

At the upper end of the algae zone is attached overflow line 68 which carries the continuously overflowing algae medium. This line also serves as an outlet for the oxygen product. Of course, the oxygen and algae medium need not be removed through the same line. Separate removal lines may be provided for the oxygen product and the algae medium. The continuous overflow is the result of continuous dilution from nutrient storage 58. The continuous dilution takes place through the recirculating line 40. The rate of dilution can be controlled by valve 56 in line 54.

The overflow line 68 leads through pump 70 to a liquid-gas separator 72 where the oxygen product is taken off and carried through line 80 to the oxygen accumulator 82. In lieu of storage, the oxygen can be directly discharged into the atmosphere. The liquid from the separator is continuously fed to centrifuge 74 wherein the nutrient liquid carried over with the algae is recovered and pumped back by pump 86 through line 84 to nutrient storage. The algae are separated out the bottom of the centrifuge and sent via line 76 to the algae collector 78. The algae collected can, if desired, be reintroduced into the algae zone. The accumulated algae are made up of about 50% protein, 30% carbohydrate and 20% fat and thus are also suitable as food for the astronaut.

As has been mentioned above, the temperature and pH of the algae medium should be maintained within limits most favorable to high algae growth rate. To achieve this, a pH meter controller is utilized. This component 28, measures pH via line 30, and adjusts the carbon dioxide input rate by automatic adjustment of valve 24 via line 26. Thus, if the pH begins to drop, the carbon dioxide input rate can be automatically reduced. If the pH rises, the input can be increased. While not shown in the drawing, the pH controller can also be employed to automatically regulate the flow of nutrient via control of valve 56 in line 54.

Component 50 is a temperature controller which measures temperature via line 52 and in accordance with this measurement automatically regulates valve 46 via line 48 to increase or decrease the flow of cooling water to heat exchanger 44.

In FIGURE 2 is shown a cross-sectional view of one type of algae zone which may be used in the practice of our invention. As can be seen, this type of algae zone consists of two concentric cylinders, the inner cylinder being adapted to receive a fluorescent lamp 64. The anular space 62 between the inner and outer cylinders is enclosed at the ends so that it will contain the algae medium.

The energy necessary to operate the fluorescent lamp is obtained from power source 66. This power source may be a solar battery or a nuclear reactor, for instance.

FIGURE 3, shows a cross-sectional view of the algae zone wherein the lights are not only in the center 88 of the zone as in FIGURE 2, but also there are a plurality of lights 90 surrounding the zone.

Referring to FIGURE 4 which shows the carbon dioxide concentrator in greater detail, the stale air containing small amounts of carbon dioxide is drawn in through line 10 and pumped by pump 100 through line 102 into port 108a of a four way valve. This valve, which is shown in section, has a body 104; ports 108a, 108b, 108c, and 108d, and a central cylindrical bore 106 with which said ports all communicate. Ports 108b and 108d of the four way valve connect through lines 112 and 120 respectively, to molecular sieves 114 and 122. The effluent from the sieves passes through lines 118 and 126, containing valves 116 and 124. Port 108c of the four way valve connects via line 138 to vacuum pump 136. The vacuum pump discharges into line 14.

The four way valve is fitted with a rotary plug 110 which turns within the cylindrical bore 106.

In operation, with the rotary plug in the position shown in FIGURE 4, the stale air is pumped through port 108a, into sieve 114, valve 116 being open. The carbon dioxide is retained by the sieve 114, with the other gases passing back into the surroundings via line 118. Simultaneously, the carbon dioxide deposited in sieve 122 during that phase of operation when the rotary plug was in the position shown in FIGURE 5, is removed through lines 120 and 138 by vacuum pump 136, valve 124 being closed.

After completion of this phase, valve controller 132 turns rotary plug 110 to the position shown in FIGURE 5 by electrical impulse, denoted by line 134; opens valve 124 by impulse denoted by line 128 and closes valve 116 by impulse denoted by line 130.

The stale air is now pumped in via line 102, through line 120 and sieve 122. The carbon dioxide remains in sieve 122 while the rest of the gases are discharged through line 126. Meanwhile, the concentrated carbon dioxide previously deposited in sieve 114 is recovered by the vacuum created by vacuum pump 136, and pumped through line 14 to the carbon dioxide surge tank 18.

In this manner, the valve controller 132, at fixed intervals, turns the rotary plug 110 from position shown in FIGURE 4 to the position shown in FIGURE 5 and back. As the rotary plug is in the former position, valve 116 is open and valve 124 is closed. On the rotary plug being turned to the latter position, valve 124 is opened and valve 116 is closed.

The overall result is to produce a continuous supply of carbon dioxide discharging through line 14. Valve controller 132, when operating as outlined above, is designed to change the valve positions at fixed time intervals. Alternatively, the valve controller can be adapted to receive impulses from gas analyzers which can be installed in lines 118 and 126. In this way, instead of the valve positions being changed at fixed intervals, the change can be effected by impulses emitted from gas analyzers whenever the carbon dioxide content in the effluent from the sieves begins to rise. This rise in the carbon dioxide in the effluent occurs as the sieve becomes filled nearly to capacity with carbon dioxide, and its adsorption efficiency begins to drop off.

The molecular sieves may be packed with any of the well-known naturally occurring or synthetic zeolites.

If desired, the water vapor may be removed from the stale air by passing it through a dehydration zone, such as a bed of silica gel, prior to its introduction via line 10 into the carbon dioxide concentrator. This prior removal of the water vapor improves the efficiency of the molecular sieves.

Such variables of the process as the absolute algae concentration, intensity of illumination, temperature, character of nutrients, and degree of agitation depend in part upon the specific algae employed. While the process can be applied to various types and species of algae, preferred are the common alga, Chlorella. Particularly preferred among species of Chlorella is the alga known as TX–71105.

When using algae of the above-mentioned variety, a medium is prepared from water, to which is added nutrients suitable for the growth of algae. A typical, suitable nutrient medium is that shown by Krauss et al., Pl. Physiol., 29, 205–214 (1954). For example, the nutrient medium may contain per liter of water, 2 grams of potassium nitrate, 0.5 gram of magnesium sulfate, 0.5 gram of potassium dihydrogen phosphate, lesser amounts of ionic phosphorus, magnesium, sulfur and potassium, as well as trace amounts of calcium, copper, iron, zinc, manganese, molybdenum and cobalt. In lieu of potassium nitrate, other nitrogen-containing nutrients such as urea and $NH_3$ may be used. It is contemplated that in space applications, the urea may be obtained from urine.

Potassium nitrate is the preferred nitrogen-containing nutrient since the potassium ion together with dissolved carbon dioxide in the algae zone forms a buffer. The presence of this buffer aids in the maintenance of the pH in the zone within prescribed limits by dampening the effects of aberrations in the balance of algae growth and carbon dioxide supply.

If a nutrient such as urea is used, it may be desirable to supply this buffering effect by the addition of a small amount of an alkali bicarbonate to the algae zone.

The temperature level at which the growth milieu is maintained can be varied to some extent according to the species of algae employed. Preferred temperature range for the algae normally used in practice of this invention is from about 25° C. to 55° C., and more preferably from about 35° C. to 37° C. Normally it is desirable to circulate cooling water through the heat exchanger 44 to maintain the temperature within the desired limits. Pressure is not critical to the operation of our photosynthetic gas exchanger. The algae zone will operate at any pressure which will maintain the aqueous medium in liquid phase.

The light employed to aid in the growth of the algae may be either natural sunlight or light produced from artificial lamps. The light source may be located inside or outside, or both, of the algae zone. In the event that the light source is inside the algae zone, the outside of the zone may be covered with a reflective material so as to prevent the loss of light energy. In the embodiment shown in FIGURE 2, sunlight may be used instead of artificial light by replacing the fluorescent lamp with a light diffusing cone, otherwise known as a "light pipe," made from a translucent material such as polymethylmethacrylate. For use in space vehicles, it is contemplated that banks of the photosynthetic gas exchangers of this invention will be used, that is, a plurality of algae columns or containers 60 connected in series or in parallel, each individual module being illuminated by sunlight.

The useful range of light wave lengths for growth of the algae approximate the visible spectrum. If desired, this spectrum can be achieved by inserting a suitable filter between the algae medium and the light source. The algae of this invention enjoy maximal growth when subject to a light intensity on the order of 1500 foot candles.

In addition to the use of the photosynthetic gas exchangers of this invention in space vehicles, as mentioned above, their use is also envisioned as a means of maintaining an adequate supply of respiratory oxygen in other confined areas such as submarines and bomb shelters.

The examples which follow are solely for purpose of illustration and should not be regarded as limitative in any way.

*Example 1*

An algae column fitted with a recirculating line and pump, a heat exchanger and a nutrient tank as shown in FIGURE 1 was employed in this example. A pH meter and thermometer were inserted in the recirculating line. A sparger was inserted into the recirculating line at the point where this line joins the bottom of the algae column. The sparger was connected to a source of carbon dioxide, and the top of the column was connected to an overflow receiver. A 150 watt fluorescent lamp was inserted into the center of the algae column and connected to an A.-C. power source. The nutrient medium disclosed by Krauss et al., Pl. Physiol., 29, 205–214 (1954), was prepared in double strength, that is, 2 grams of $KNO_3$ per liter of water was used in lieu of 1 gram per liter. Similarly, the concentration of all of the other nutrient ingredients was doubled. The nutrient tank was filled with this solution. To the algae column was added 1220 ml. of the same solution. Chlorella TX–71105 was added to the algae column to give a concentration of three to four grams of algae per liter, based on the dry weight of the algae. The recirculating pump, cooling water on the heat exchanger, and fluorescent lamp were turned on and the system was operated until the steady-state temperature of the aqueous medium in the column was established at 35–37° C. by regulation of the flow of water to the heat exchanger. An increase in pH was noticed on the pH meter, at which point the addition of 100% carbon dioxide through the sparger in the recirculating line was begun, the carbon dioxide being added at a rate of 2 to 4 ml. per minute, as measured at standard temperature and pressure. The addition of nutrient into the recirculating line from the nutrient storage tank was begun. The nutrient medium was added at a rate of 2030 ml. per day. The carbon dioxide addition rate was manipulated until equilibrium of algae growth and carbon dioxide addition was established, as was evidenced by constancy of the pH and effluent gas composition. Equilibrium was reached within 2–5 days after start-up, pH remaining within the range of 5.5 to 7.5 and the carbon dioxide content of the effluent gas remaining within the range of 0.5% to 9.0% by volume. Once this steady-state condition was reached, the following data were obtained with a feed stream of 100% carbon dioxide.

TABLE 1

| Days after establishment of equilibrium | 100% $CO_2$ added ml./day (gas vol. measured at S T P) | pH | Temp., °C. | Percent by vol. $O_2$ in effluent |
|---|---|---|---|---|
| 1 | 4.7 | 6.0 | 34.0 | 90.2 |
| 2 | 4.7 | 6.1 | 34.9 | 92.6 |
| 5 | 4.5 | 6.1 | 35.0 | 93.9 |
| 6 | 4.5 | 6.4 | 35.3 | 96.0 |
| 7 | 4.5 | 6.4 | 37.2 | 96.7 |

*Example II*

When the procedure set forth in Example 1 was repeated using a feed stream containing 70% by volume of $CO_2$, the following results were obtained.

TABLE 2

| Days after establishment of equilibrium | 70% $CO_2$ added ml./day (gas vol. measured at S T P) | pH | Temp., °C. | Percent by vol. $O_2$ in effluent |
|---|---|---|---|---|
| 2 | 5.2 | 7.0 | 37.0 | 78.1 |
| 3 | 5.5 | 6.7 | 37.0 | 80.6 |
| 4 | 4.7 | 6.1 | 37.0 | 72.3 |
| 6 | 5.2 | 6.2 | 36.6 | 76.0 |

The foregoing examples are presented for purposes of illustration only, and it is intended that the invention should be limited solely by the lawful scope of the appended claims.

We claim:

1. A process for the continuous conversion of a gas feed stream containing at least 70% by volume of carbon dioxide to a gas product stream containing a relatively high proportion of oxygen, which process comprises establishing an algae zone, passing through said algae zone an aqueous medium comprising the alga Chlorella and nutrient, maintaining the pH in said aqueous medium within a range of about 5 to about 7 and maintaining the temperature of said aqueous medium within a range from about 35° C. to about 37° C., continuously diluting said aqueous medium with an aqueous solution of said nutrient, continuously supplying said algae zone with visible light, continuously passing a gas feed stream containing at least 70% by volume of carbon dioxide into and through said algae zone in finely dispersed form, continuously removing excess liquid medium and product gas stream containing a relatively high proportion of oxygen from said algae zone, and recovering said product gas stream containing a relatively high proportion of oxygen.

2. The process of claim 1 wherein the aqueous medium comprising algae and nutrient is passed through the algae zone, and the gas feed stream is passed through the algae zone in countercurrent relation to said aqueous medium.

3. The process of claim 1 wherein the nutrient comprises potassium nitrate.

4. The process of claim 1 wherein the nutrient comprises $NH_3$.

5. The process of claim 1 wherein the nutrient comprises urea.

6. Apparatus for the continuous conversion of a gaseous feed stream containing a small amount of carbon dioxide to a product stream containing a high conrentration of oxygen comprising: concentrating means adapted to receive a carbon dioxide-retaining material; means for forcing said gaseous feed stream through said concentrating means; a chamber adapted to receive an aqueous composition comprising algae and nutrient; a pH measuring means positioned to contact said aqueous composition; means for removing the carbon dioxide retained within said concentrating means and conveying said carbon dioxide to said chamber adapted to receive an aqueous composition comprising algae and nutrients, including an adjustable valve means adapted to control the feed rate of said carbon dioxide stream and control means connecting said pH measuring means to said valve means whereby the flow rate of said carbon dioxide stream is proportioned to the pH of said aqueous medium; means for continuously circulating said aqueous composition through said chamber; a light source adapted to illuminate the interior of said chamber; means for continuously adding nutrient to said chamber; and means for continuously removing algae, nutrient and oxygen from said chamber.

7. Apparatus as set forth in claim 6 wherein the means for continuously removing algae and oxygen from said chamber, adapted to receive an aqueous composition comprising algae and nutrient, comprises: a gas-liquid separator, an algae-liquid separator, and lines connecting said chamber with said gas-liquid separator, and said gas-liquid separator with said algae-liquid separator.

8. Apparatus as set forth in claim 6 wherein the concentrating means contains a molecular sieve.

9. The apparatus of claim 6 wherein the means for continuously circulating said aqueous composition through said chamber adapted to receive an aqueous composition comprising algae and nutrient, includes a heat exchanger for controlling the temperature of said aqueous composition.

10. The apparatus of claim 9 including a temperature sensing means placed in contact with said circulating aqueous composition and adapted to control said heat exchanger.

11. The apparatus of claim 6 including a pH measuring means placed in contact with said aqueous medium containing algae and nutrient; said means for removing the carbon dioxide retained within said concentrating means and conveying said carbon dioxide to said chamber adapted to receive an aqueous composition comprising algae and nutrient, including an adjustable value means adapted to control the feed rate of said carbon dioxide stream, control means connecting said pH measuring means to said valve means whereby the flow rate of said carbon dioxide stream is proportioned to the pH of said aqueous medium; and the means for continuously circulating said aqueous composition through said chamber including a heat exchanger adapted to maintain the aqueous composition at a constant temperature.

12. The apparatus of claim 11 including a temperature sensing means in contact with said continuously circulating aqueous composition, said sensing means being operatively connected with said heat exchanger through a control circuit.

13. Apparatus for the continuous conversion of a gaseous feed stream containing a small amount of carbon dioxide to a product stream containing a high concentration of oxygen comprising: a plurality of containers connected in parallel with each being adapted to receive a carbon dioxide-retaining material; means for forcing said gaseous feed stream through said containers, a second chamber adapted to receive an aqueous composition comprising algae and nutrient, a pH measuring means positioned to contact said aqueous composition, cyclically actuated valve means connecting said containers and adapted to control the pressurized feed to an individual container, and to control the evacuation of carbon dioxide from an individual container whereby at least one container is being pressurized while at least one container is being evacuated and vice versa; means for conveying carbon dioxide from said container to said chamber, including an adjustable valve means adapted to control the feed rate of said carbon dioxide stream, and control means connecting said pH measuring means to said valve means whereby the flow rate of said carbon dioxide stream is proportioned to the pH of said aqueous medium; means for continuously circulating said aqueous composition through said chamber, a light source adapted to illuminate the interior of said chamber; means for continuously adding nutrient to said chamber; and means for continuously removing algae, nutrient and oxygen from said chamber.

14. The appartus of claim 13 including a vacuum pump connected in series between said containers and said chamber.

References Cited by the Examiner

UNITED STATES PATENTS 2,658,310  11/1953  Cook.

OTHER REFERENCES

Ludwig, C. A., The Availability of Different Forms of Nitrogen to a Green Alga, in Chemical Abstracts, vol. 32, column 8481, 1938.

Scott, G. T., The Mineral Composition of Chlorella Pyrenoidosa, in Journal of Cellular and Comparative Physiology, 21 (3): pp. 327–338, June 1943.

Burlew, J. S., Algal Culture, Publication 600, Carnegie Institution of Washington, D.C., July 15, 1953, pages 41, 184, 185.

Humphrey, A. E., et al., Keeping Men Alive in Space Rockets in Chemical Engineering (magazine), 67 (8): pp. 183–186, April 18, 1960.

Gafford, R. D., et al., Mass Algal Culture in Space Operations, in Journal of Biochemical and Microbiological Technology and Engineering, 2 (3): pp. 299–311, September 1960.

Gaucher, T. A., et al., Mass Propagation of Algae for Photo-synthetic Gas Exchange, in Journal of Biochemical and Microbiological Technology and Engineering, 2 (3): pp. 339–359, September 1960.

Osterlind, S., The Retarding Effect on High Concentrations of Carbon Dioxide on Alga, in Physiologia Plantarum (magazine, Copenhagen, Denmark) 1 (2): pp. 170–175, 1948.

Bergeron, P. J. et al., Aspects Chimiques de l'Energie Solaire, in Chimie et Industry (magazine, Paris, France), 79 (3): pp. 271–282, March 1958.

ABRAHAM G. STONE, *Primary Examiner.*

T. GRAHAM CARVER, *Examiner.*